United States Patent [19]
Drushel

[11] Patent Number: 4,463,240
[45] Date of Patent: Jul. 31, 1984

[54] ELECTRIC DISCHARGE MACHINE SERVO CONTROL

[75] Inventor: Robert W. Drushel, Farmington Hills, Mich.

[73] Assignee: Ex-Cell-O Corporation, Troy, Mich.

[21] Appl. No.: 298,547

[22] Filed: Sep. 1, 1981

[51] Int. Cl.³ .............................................. B23P 1/08
[52] U.S. Cl. .................................... 219/69 G; 219/695
[58] Field of Search ............... 219/69 G, 69 C, 69 R, 219/69 S, 69 P, 68

[56] References Cited
U.S. PATENT DOCUMENTS

| | | | |
|---|---|---|---|
| 3,755,645 | 8/1973 | Kauffman | 219/69 G |
| 3,767,886 | 10/1973 | Sennowitz | 219/69 G |
| 3,848,108 | 11/1974 | Takarada | 219/69 G |
| 3,927,293 | 12/1975 | Bell, Jr. | 219/69 G |
| 4,107,504 | 8/1978 | Dinsdale | 219/69 G |

Primary Examiner—M. H. Paschall
Attorney, Agent, or Firm—John C. Evans

[57] ABSTRACT

Servo control circuits particularly suited for electric discharge machining apparatus to provide the input to the servomechanism which actuates the tool feed during machining.

These circuits respond to a setting of desired gap emf and an input of actual gap emf to control tool movement so as to equalize these inputs. They respond to abnormally low gap emf during the machining "on" pulse to retract the tool to allow the gap to clear of debris.

The gap emf during the "on" period of the pulse cycle is stored in a small capacitor coupled to a high-impedance input to power circuits of the servo control, which capacitor normally retains most of its charge during the "off" time of the cycle. Logic circuits responding to the pulse generator and the gap emf discharge this capacitor when abnormally low gap emf occurs during cycle "on" time.

The transistorized circuit directly supplying the servo valve operating coil (or other transducer controlling electrode feed) provides for control by inexpensive low power elements of small size and low energy dissipation.

6 Claims, 2 Drawing Figures

ELECTRIC DISCHARGE MACHINE SERVO CONTROL

SUMMARY OF THE INVENTION

This invention is directed to improvements in the control of electric discharge machining apparatus, commonly called EDM machines. As is well known, such machines erode or remove material from a workpiece by rapidly repeated electrical discharges between a tool and the workpiece. The process is important because of its adaptability to forming involved shapes and its success with very hard materials.

Briefly, a typical EDM machine comprises a support for a workpiece which is immersed in a dielectric liquid. A head with servo means for moving it feeds the cutting electrode or tool to the workpiece. A power output control transmits short-duration pulses from a D.C. power source to the tool and workpiece, thus effecting discharges across the gap between them which erode the workpiece. The servo is controlled to maintain a very small gap. The power output control responds to triggering pulses fed from an adjustable pulse generator. The frequency and duration of pulses, and the energy in the discharges, are variable to meet the requirements of the job.

It is important that expensive EDM machines operate as efficiently and swiftly as possible. It is even more important to avoid damage to the tool or workpiece resulting from a short circuit between them. Such short circuits may result from accumulation of chips in the gap. They cause local heating which may ruin both the workpiece and the tool. EDM machines normally include means responsive to such conditions to shut off or reduce power and to reverse tool feed temporarily to avoid such damage.

This invention is directed to improvements in EDM control for better ease of control and speed and flexibility of operation, and to avoid damage from short circuits. More particularly, it relates to automatic servo control circuits. These power control circuits are adapted to mounting on standard circuit boards.

The nature of the improvements will be clear to those skilled in the art from the detailed description and drawings of the preferred embodiment.

THE DRAWINGS

FIG. 1 is a block diagram of an EDM control system.
FIG. 2 is a schematic diagram of the servo control system of this invention.

DETAILED DESCRIPTION

Figure 1:
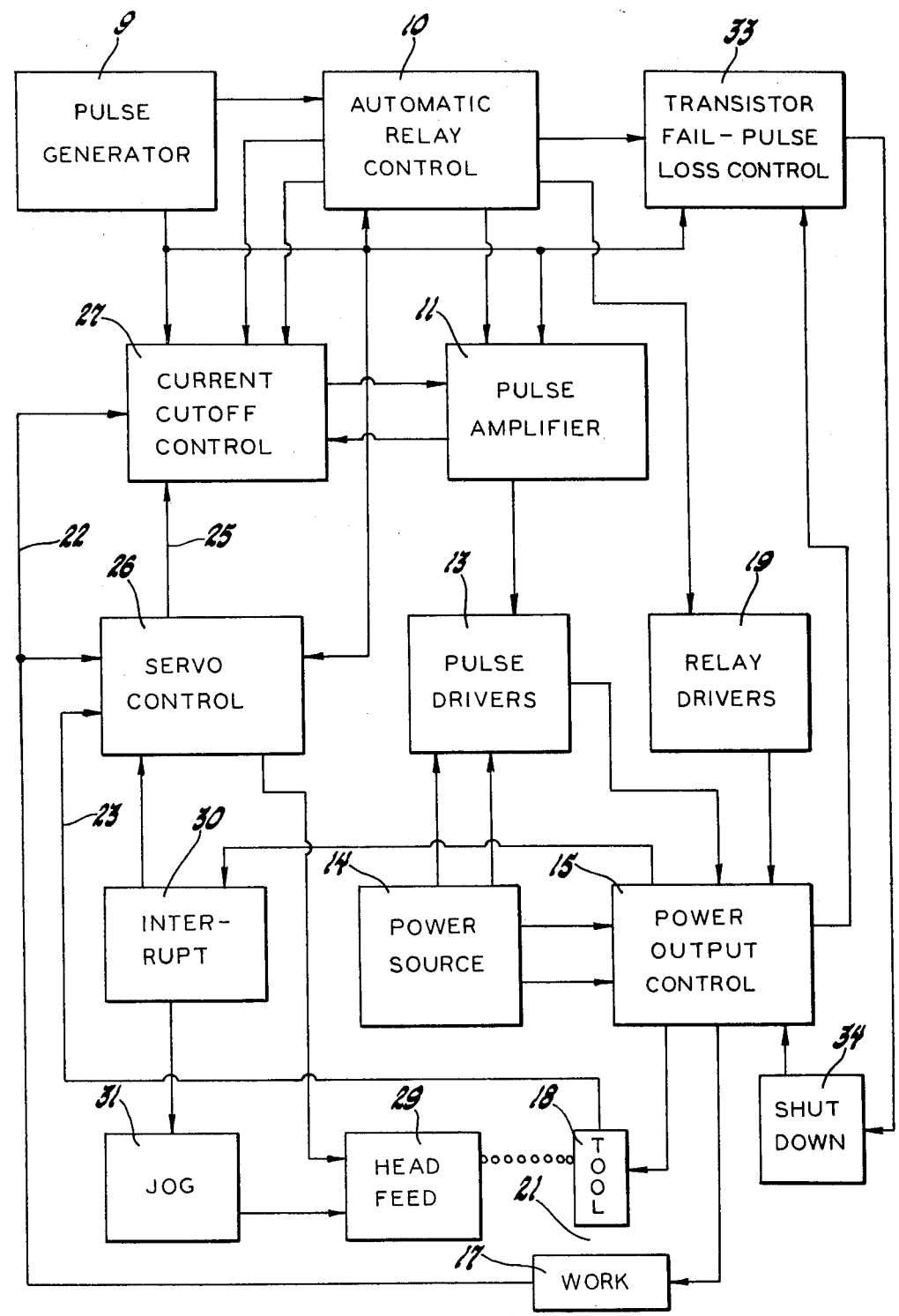

General Introduction (FIG. 1)

A pulse generator 9 provides various timing pulses to other elements of the system, including a master pulse which determines the frequency and duration of the power pulses. An automatic relay control 10 generates outputs responsive to the period of the master pulse. A pulse amplifier 11 responds to the master pulse to energize pulse drivers 13. These drivers transmit power from a source 14 to turn on power output transistors in a power output control 15. The power output control delivers D.C. pulses to the workpiece 17 and and tool 18. The energy level of the pulse is controlled by resistor banks in the power output control inserted into the circuit by relays energized by relay drivers 19, which are in turn controlled by signals from the relay control 10.

The emf across the tool-workpiece gap 21 is transmitted through lines 22, 23 and 25 to a servo control 26 and the current cutoff control 27. The current cutoff control also receives the master pulse from the pulse generator 9 and control signals from the relay control 10. It acts through the pulse amplifier 11 to control power feed to the gap in the event of abnormal conditions.

The servo control 26 may incorporate an electrohydraulic valve controlling a cylinder in the head feed 29, which is mechanically connected to the tool 18. The servo controlled feed may be interrupted by an interrupt circuit 30 responsive to a signal from the power output control. The interrupt circuit 30 also acts through a job circuit 31 to move the tool to or from working position.

A transistor fail-pulse loss control 33 is provided to safeguard the machine and work against damage due to electrical system failures. This receives inputs from the pulse generator, the relay control, and the power output control and acts through a shutdown control 34 to put the system on stand-by, shutting off delivery of power from the output control 15.

This general description of a preferred EDM control system should provide sufficient background for understanding the preferred environment of the servo control.

Figure 2:
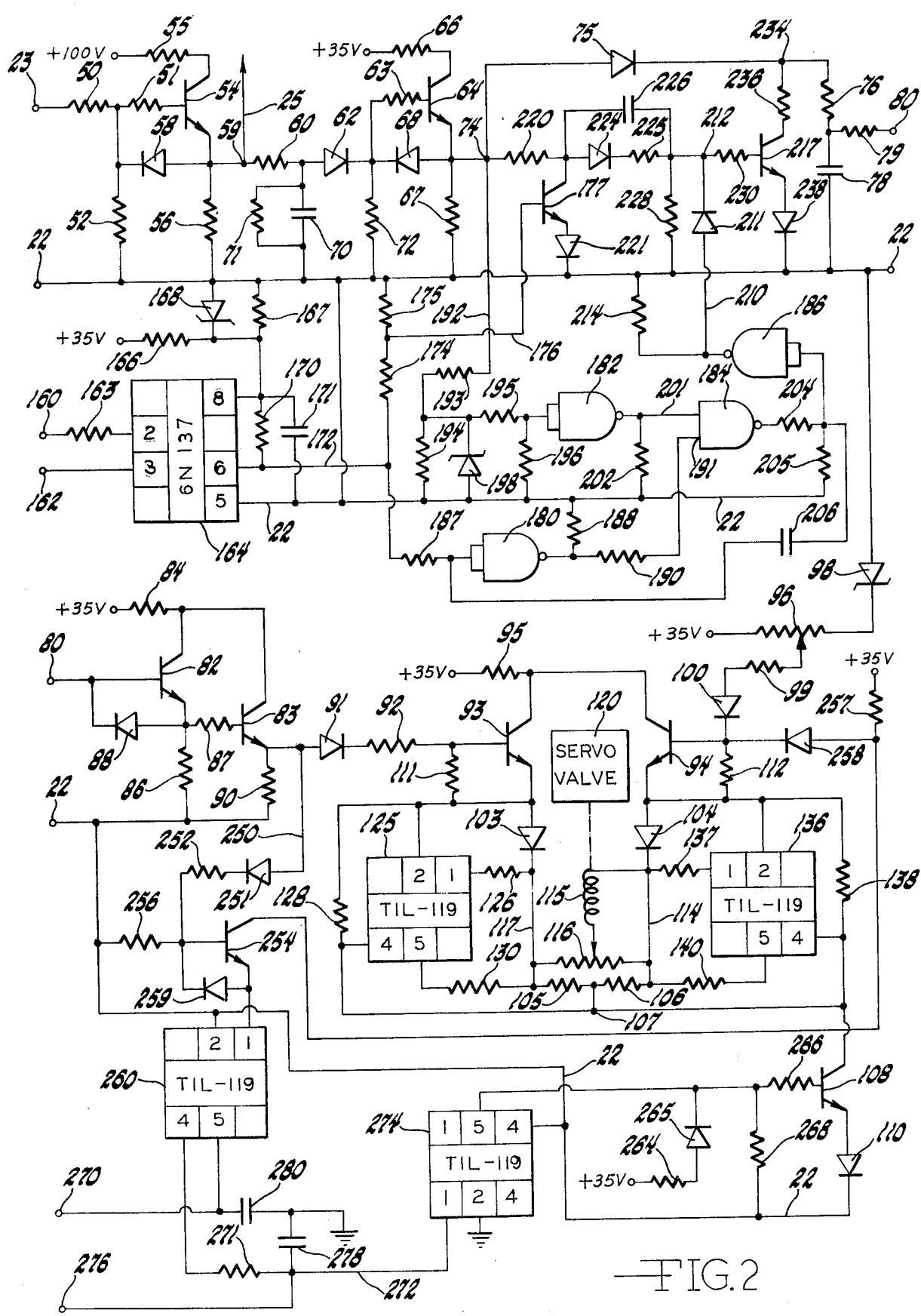

Servo Control (FIG. 2)

Referring now to FIG. 2, this is a diagram of the preferred embodiment of the servo control circuit. This responds primarily to inputs of desired gap emf, actual gap emf, and the master pulse which controls the timing of the machining pulses. In the preferred embodiment, it delivers a variable reversible emf to a coil controlling a servo valve which directs hydraulic fluid to a tool feed cylinder.

Lines 22 and 23 connected respectively to the negative and positive sides of the machining gap enter FIG. 2 at the upper left to provide an input of gap emf. Line 22 provides a floating servo common for circuits to be described. Line 23 is connected through 1 kilohm resistor 50, 220 ohm resistor 51, and 100 kilohm resistor 52 to the base of a transistor 54 and to common line 22, as shown. The collector of this transistor is energized from plus 100 V. D.C. through 10 ohm resistor 55, and its emitter is connected to common line 22 through 47 kilohm resistor 56. A diode 58 is a clamp to protect the emitter-base circuit.

Emitter follower transistor 54 provides a stiff signal of increased power to a junction 59. Gap emf line 25 to the current cutoff control 27 is taken off from this junction. It also provides the input to a second emitter follower circuit which scales the signal down to about ⅓ level for the servo control.

Junction 59 connects through 10 kilohm resistor 60, diode 62, and 1 kilohm resistor 63 to the base of transistor 64. The collector of 64 is energized from +35 V. D.C. (referred to line 22) through a 10 ohm resistor 66, and the emitter connects to line 22 through a 4.7 kilohm resistor 67. Diode 68 protects the transistor. The input is filtered by 750 picofarad capacitor 70 and 10 kilohm resistor 71. A 22 kilohm resistor 72 grounds the cathodes of diodes 62 and 68 to line 22.

The output of emitter follower 64, at a junction 74, is a stepped-down reproduction of gap emf. This control emf at junction 74 is directed through several circuits. That leading to the servo valve control runs through a diode 75, type 1N4935, having a maximum drop of 0.6 volts, and a 47 ohm resistor 76 to a 0.05 microfarad ceramic capacitor 78 the other side of which is grounded to common line 22. The plus side of this capacitor is coupled through a 47 kilohm resistor 79 to a terminal 80. This feeds into a high-impedance input of servo circuits to be described, which can drain the capacitor at a rate of only about 4 to 12 microamperes.

It should be emphasized that small capacitor 78 is not an integrating device. It provides for temporary storage of the gap emf signal, and holds a relatively constant emf during the "off" or zero emf portion of the pulse cycle. In the event of abnormal gap conditions, it is very quickly drained, as will be explained after the description of the servo control output circuits.

Lines 80 and 22 are continued in the lower part of FIG. 2. The gap emf responsive potential between these lines proceeds through two concatenated emitter follower stages including transistors 82 and 83. These are very small transistors, type 2N3903. Transistor 82 is a low drain emitter follower, transistor 83 is a signal power boost emitter follower. The collectors of these are energized from +35 V. through 10 ohm resistor 84. The base of 82 is directly connected to line 80, and its emitter is grounded to line 22 through 33 kilohm resistor 86 and connected to the base of transistor 83 through 1 kilohm resistor 87. Diode 88 acts as an emitter-base clamp. The emitter of transistor 83 is grounded through 4.7 kilohm resistor 90. The emitter provides a stiff master control signal to the input of differential output circuits, to be described, through a diode 91 and a 100 ohm resistor 92. This control signal input goes to the base of an emitter follower transistor 93.

Transistor 93 and a transistor 94 are in identical parallel circuits of a differential output control. Transistor 93 receives a gap emf signal, transistor 94 a desired gap emf command signal. The output control energizes the tool feed control servo to maintain a match between these signals. The collectors of transistors 93 and 94 are energized in parallel from +35 V. through a 10 ohm ½ watt resistor 95.

The base of transistor 93 receives a feedback signal as described above. The base of transistor 94 receives a potential representing a command input from a potentiometer 96 settable by the machine operator. This potentiometer is energized from +35 V. through the potentiometer and a 5.1 volt Zener diode 98 to common line 22. The diode provides a 5.1 volt floor to the voltage taken from the slider of the potentiometer. This command signal is fed through 100 ohm resistor 99 and a diode 100 to the base of transistor 94.

As previously stated, transistors 93 and 94 are connected in identical parallel emitter follower circuits, energized from +35V. through resistor 95. The emitters of these transistors are connected through diodes 103 and 104 and 1.5 kilohm resistors 105 and 106, respectively, to a junction 107. This junction is grounded to common line 22 through the collector-emitter circuit of a transistor 108 and a diode 110 when gap conditions are normal. The emitters are connected to the bases through 10 kilohm resistors 111 and 112.

Obviously, the emitters of transistors 93 and 94 follow the inputs on their bases, so the difference between potential levels at the emitters reflects the discrepancy or error between the control signal and the command signal. This is the output of the circuit. It is fed from line 114 through valve controlling solenoid 115 to the movable tap of a 2.5 kilohm potentiometer 116 connected between line 114 and line 117. Potentiometer 116 serves to attenuate the output under control of the machine operator to adjust the speed and acceleration of the tool feed servomechanism to the requirements of the particular machining operation. The potentiometer and coil are located on the machine remote from the control circuits.

Clearly the potential across coil 115 is substantially proportional to the difference between the inputs to transistors 93 and 94. Solenoid 115, which is a 1200 ohm coil, drives a servo valve 120, which may be of suitable known type, and which controls operation of a hydraulic cylinder (not illustrated) in head feed 29 which drives the tool 18.

What has been described would suffice as a servo control. However, this invention overcomes substantial defects of such a basic servo control by incorporation of circuits responsive to reverse bias on either diode 103 or 104 to provide a relatively low resistance shunt to the resistor 105 or 106 in the other side of the differential output control.

Referring first to the circuit through transistor 93, its emitter is connected to the input circuit of an opto-coupler 125 of type TIL-119, the input circuit being completed to line 117 through a 10 ohm resistor 126. The emitter is also connected through 100 ohm resistor 128 to the output of the opto-coupler, which is also connected to junction 107. The other terminal of the output is connected through 100 ohm resistor 130 to line 117. Opto-coupler 125 is a known device commercially available from Texas Instruments, Inc. It incorporates an infra-red emitting diode in the input circuit and a phototransistor in the output circuit. The connections to it are as indicated on FIG. 2. The opto-coupler acts as a transducer without any electrical coupling between input and output circuits.

An identical opto-coupler is connected in the same way in the circuit of transistor 94, through resistors 137, 138 and 140. In each case, terminals 1 and 2 connect to the anode and cathode, respectively, of the diode, and terminals 4 and 5 to the emitter and collector, respectively, of an NPN phototransistor circuit. Thus, the diode is forward-biased away from line 114 or line 117.

Now, to explain the operation of this circuit, let us assume that the command signal fed to the base of transistor 94 is constant, which it normally is unless the machine operator adjusts potentiometer 96 to change the gap voltage setting. Now, if gap voltage increases above the setting, base voltage on transistor 93 increases, becoming greater than the input to transistor 94. The higher base voltage is followed by the emitter, increasing accordingly the potential on line 117 and the drop through resistor 105. The higher potential feeds through potentiometer 116 and solenoid 115 to line 114. With emitter potential of transistor 94 remaining substantially constant, diode 104 is backbiased, and the light-emitting diode in 136 is forwardbiased and conducts current from line 114 through resistors 137 and 138 to junction 107. This turns on the transistor circuit from line 114 through resistor 140 and the opto-coupler to junction 107.

As a result, 1500 ohm resistor 106 is shunted by 100 ohm resistor 140 and the output circuit of the coupler, which has a low drop. Therefore, solenoid current flows through a roughly 100 ohm path to junction 107 instead of a 1500 ohm path, the heat losses are much reduced, and small resistors may be used. In the preferred embodiment, resistors 112, 137, and 140 are ¼ watt, and resistors 106 and 105 are 2 watt.

Besides reducing heat generation in the solenoid control circuit, the reduction in resistance increases the flow through the solenoid 115 for a given differential between the two inputs at transistors 93 and 94, increasing sensitivity and performance.

If the control signal decreases below the command signal, operation will be obvious from the foregoing, since the circuits are symmetrical. In either case, the solenoid 115 operates through valve 120 to increase, decrease, or reverse the tool feed as required.

It will be clear that the servo control circuit just described is usable with other types of servomechanisms which respond to an electrical input as, for example, electric motor servos.

We now consider further refinements of the gap emf feedback circuit which provides the input to transistor 93. As previously stated, a small capacitor 78 is charged through circuits including transistors 54 and 64. The emf on this capacitor is fed to transistor 93 through transistors 82 and 83. Capacitor 78 is charged during machining cycle "on" period, and normally retains most of the charge during "off" time of the cycle. It is discharged rapidly to reverse servo feed if gap voltage during the "on" period becomes abnormally low.

For these purposes, the servo control receives an input of the master pulse developed by pulse generator 9, which master pulse also controls the duration of machining pulse on and off time.

The master pulse enters the servo control at terminals 160 and 162, which connect through 330 ohm resistor 163 to the input (light-emitting diode) terminals of a high-frequency opto-coupler 164 type 6N137 available from Hewlett-Packard. This coupler receives five volt energization from +35 V. through a conventional circuit of resistors 166 and 167 and Zener diode 168. Terminal 8 of the opto-coupler is connected to the output terminals through 1 kilohm resistor 170 and 0.01 mfd capacitor 171 as shown. Output terminal 5 connects directly to the floating ground 22 and output terminal 6 to line 172 and thence through 2.2 kilohm resistor 174 and 10 kilohm resistor 175 to the floating ground. This provides an input through line 176 to the base of a transistor 177, to be explained.

Line 172 also provides an input to logic circuits including four type DM7400 NAND gates 180, 182, 184 and 186. The signal on lines 160 and 162 is high when the machining gap is "on", low when it is "off". Coupler 164 inverts this signal. Gate 180 re-inverts the signal, which it receives through a 100 ohm resistor 187. The output of gate 180 is grounded through one kilohm resistor 188 and connected through 220 ohm resistor 190 to one input 191 of NAND gate 184.

Junction 74, which carries the stepped-down gap emf signal, is connected by line 192, resistors 193 (3.3 kilohm), 194 (4.7 kilohm) 195 (220 ohms) and 196 (1 kilohm) and Zener diode 198, as shown, to both inputs of gate 182 and to ground at 22. The Zener limits the input to gate 182 to 5 volts. Gate 182 is an inverter. During the "on" portion of the pulse cycle its input is high, and during the "off" period its input is low. It provides the inverse signal to the input 201 of NAND gate 184. A 1 kilohm resistor 202 connects this input to ground.

Since the input on line 191 to gate 184 is high during the pulse "on" period, and the input on line 201 is high when gap emf is low, gate 184 delivers a high signal except when gap emf is low during the "on" portion of the cycle. This output is then inverted by gate 186, which delivers a high signal only when gap emf is low during the "on" portion of the cycle.

Gate 184 is connected to the inputs of gate 186 by a 470 ohm resistor 204, and the inputs are grounded through 2.2 kilohm resistor 205. This input is also connected through a 100 picofarad capacitor 206 to the inputs of inverter 180. This feedback improves the output wave form of the logic circuits. The output from inverter 186, which is high when gap emf is low during the machining pulse, is conducted through line 210 and diode 211 to a junction 212 for a purpose to be described. Line 210 is grounded through 4.7 kilohm resistor 214.

This brings us to circuits involving transistors 177 and 217 for affecting the emf stored in capacitor 78 in response to abnormal gap conditions. The inputs to these circuits are; first, stepped-down gap emf at junction 74; second, a signal on line 176 to transistor 177, which is high when the master pulse is "off"; and third, one on line 210 from the logic circuits, which is high when gap emf is low.

Junction 74 is connected through 3.3 kilohm resistor 220 to the collector of transistor 177, the emitter of which is grounded through diode 221. This transistor acts as a clamp when the master pulse is "off". The high signal to the base turns this transistor on to pull the potential at its collector down. This turns transistor 217 off. The collector of transistor 177 is connected through diode 224 and 2.2 kilohm resistor 225 to junction 212. A 200 picofarad capacitor 226 bridges components 224 and 225. Junction 212 is grounded through 10 kilohm resistor 228 and coupled to the base of transistor 217 through a 470 ohm resistor 230.

Junction 212 also receives an input from the logic circuits through diode 211. Therefore, if either of the inputs to junction 212 is high, transistor 217 is turned on. Current then flows from a junction 234 through 4.7 kilohm resistor 236, transistor 217, and diode 238 to common line 22. If transistor 217 is turned off, small storage capacitor 78 may discharge only slowly into the transistor 82. However, when transistor 217 conducts, there is a low-resistance discharge path for capacitor 78 through resistor 236. Transistor 217 conducts when gap emf is low during the "on" time of the cycle. It is held off during the "off" time of the cycle. Thus, if gap voltage drops to an abnormally low level during the metal-removing portion of the cycle, capacitor 78 is drained to cause the servo to back off; but the normal drop in gap voltage during the "off" time of the cycle does not affect the capacitor which loses only a slight portion of its charge.

Since a drop in potential of capacitor 78 indicates to the servo valve control circuits that the tool is too close to the work, the servo circuits will react to stop or back off the tool in this case. However, when conditions at the gap are stable and satisfactory, the input to transistor 93 remains nearly constant. The machine operator may set the desired gap voltage at potentiometer 96, and the servo will maintain it, responding when needed to low gap emf which may be caused by chips in the gap.

Gap emf may be indicated to the operator by a slow-response voltmeter (not shown) connected to the emitter of transistor 83.

Now to an additional feature of the servo control, which relates to control during traverse of the tool head. In brief outline, this involves means operative during traverse or jogging of the machine tool head to turn off the differential emitter follower circuit control of the servo valve 120, and also means responsive to abnormally low gap emf to re-establish servo control. Such abnormally low gap emf could be due to control between the tool and workpiece.

A line 250 leading from the emitter of transistor 83 conducts a gap emf signal through a blocking diode 251 and 6.8 kilohm resistor 252 to the base of a transistor 254, which is grounded to the common through 10 kilohm resistor 256. The collector is energized from +35 V. through 2.2 kilohm resistor 257. The base is connected through diode 258 to the base of transistor 94. A diode 259 connects the emitter of transistor 254 to the base. The emitter is connected to common through the input circuit of another opto-coupler 260, type TIL-119, for a reason to be explained.

If gap voltage is high, transistor 254 will turn on and pull its collector voltage down to about 2 volts, lower than can be set on potentiometer 96. However, low gap voltage, turning the transistor off, sends a substantially 35 V. signal through diode 258, overriding the signal from potentiometer 96. This tells the servo control that gap emf is too low, and the servo will retract the tool. The maximum signal from transistor 254 or from the potentiometer is higher than the maximum input to transistor 93, so that the machine is instructed that the gap is too short.

The above assumes that the differential servo control circuit is operative. It is only when transistor 108 is conductive to allow flow to the floating common through the differential control circuit. Transistor 108 normally is held conductive by an input from +35 V. through a 1500 ohm resistor 264, a blocking diode 265, and a 100 ohm resistor 266 to its base. A 1 kilohm resistor 268 normally couples this base circuit to common.

However, the base of transistor 108 is normally grounded during head traverse by an input from the cycle interrupt circuit 30 (FIG. 1). This circuit proceeds from an input connection 270 through the output circuit of opto-coupler 260, a 100 ohm resistor 271, a line 272, and the input circuit of opto-coupler 274 of type TIL-119 to ground. Line 276 is a current return line to the cycle interrupt circuit 30. Capacitors 278 and 280 are 0.1 mfd and 6.8 mfd, respectively. These filter the circuits to ground.

When the input of opto-coupler 274 is energized, its output circuit grounds the base of transistor 108, turning it off and thus disabling the servo control valve 120. This occurs in response to the input on line 270 from the cycle interrupt circuit.

However, transistor 108 is turned back on during head traverse if a short circuit or other abnormally low gap condition occurs. If transistor 254 turns off in response to low gap emf, it deenergizes the input circuit of opto-coupler 260, thereby opening its output circuit. This opens the input circuit of opto-coupler 274, and thus breaks the ground on the base of transistor 108. The differential circuit is thus restored to control of the servo valve. This function is very useful to terminate traverse of the tool to the work at the moment a proper machining gap is established.

The utility, novelty, versatility, and economic practicability of the servo control system described above should be apparent to those skilled in the relevant arts. The precise description of the preferred embodiment is not to be considered as limiting the scope of the invention.

I claim:

1. A servo control system for an electric discharge machining apparatus to control relative movement between a tool and a workpiece defining a gap across which rapidly repeated electrical pulse discharges act to machine the workpiece comprising, in combination, circuit means having high input impedance responsive to gap emf effective to generate a control emf representative of instantaneous gap emf, a storage capacitor, a charging circuit connecting the said circuit means to the said capacitor to transmit the control emf to the capacitor, a high input impedance servo control system responsive to momentary emf of the said storage capacitor to control relative movement of the tool and workpiece to optimize gap width by increasing gap width in response to low storage capacitor emf, a discharge circuit connected to the storage capacitor operable to provide a discharge path from the capacitor of impedance much lower than that of the servo control system input, and logic circuit means responsive to gap emf and to gap discharge "on" condition effective in response to gap emf below a predetermined threshold during and only during "on" time of the pulse discharges to activate the discharge circuit to rapidly discharge the said storage capacitor so as to drive the servo control system to widen the gap.

2. A servo control system for an electric discharge machining apparatus to control relative movement between a tool and a workpiece defining a gap across which rapidly repeated electrical pulse discharges act to machine the workpiece comprising, in combination, emitter-follower electronic circuit means responsive to gap emf to generate a control emf representative of instantaneous gap emf, a storage capacitor responsive to said circuit means, a high input impedance servo control system responsive to momentary emf of the said storage capacitor to control relative movement of the tool and workpiece to optimize gap width, a low-impedance shunt for the said capacitor, and logic circuit means responsive to gap emf below a predetermined threshold during "on" time of the pulse discharges to activate the shunt and thus discharge the said storage capacitor so as to drive the servo control system to widen the gap, the said storage capacitor having sufficient capacity in relation to the input impedance of the servo control system to retain the major portion of its charge during the intervals between the electrical pulse discharges when not so shunted.

3. A servo control system for maintaining equilibrium between a command input and a feedback input from a controlled operating system comprising a pair of matched electronic response circuits responsive respectively to the said inputs, the response circuits being connected in parallel across a source of electrical energy, each response circuit comprising a first connection from one side of the source through a resistor and the emitter-collector circuit of a transistor connected in emitter-follower configuration to the inputs so that the potential drops across the resistors follow the inputs, the output of the servo control being connected to the resistors so that polarity of the output responds to the sense of the error between command and feedback inputs, and the resistor in that response circuit having the lower input is energized through the transistor in the other response circuit; characterized by means for shunting either resistor when so energized including a diode in each response circuit and a shunt for the resistor in each circuit activated by reverse bias of the diode caused by a differential of emf values between the said resistors.

4. A servo control system as recited in claim 3 in which the said shunting means includes an opto-coupler having its input and output circuits connected across the said resistor.

5. A servo control system for maintaining equilibrium between a command input and a feedback input from a controlled operating system comprising a pair of matched electronic response circuits responsive respectively to the said inputs, the response circuits being connected in parallel across a source of electrical energy, each response circuit comprising a first connection from one side of the source through a resistor and the emitter-collector circuit of a transistor, the base of the transistor being connected to receive the input, the transistor thus acting as an emitter follower, the output from the servo control system having as its terminals a point on each of the first connections between the resistor and the transistor, so that the potential across the said terminals responds to the difference between the command and feedback inputs, and a transducer connecting the said terminals; in which the improvement comprises, in each response circuit, a normally forward-biased diode connecting the resistor to the transistor, an opto-coupler with its input and output circuits both connected in parallel to the said resistor, the input circuit of the opto-coupler including a diode connected to the resistor in opposite polarity to the first mentioned diode, so that the said resistor is bridged by the output circuit of the opto-coupler when the first mentioned diode is reverse biased, the bridging circuit through the opto-coupler being of substantially lower impedance than the said resistor.

6. A servo control system for an electric discharge machining apparatus to control relative movement between a tool and a workpiece defining a gap across which rapidly repeated electrical pulse discharges act to machine the workpiece comprising, in combination, circuit means having high input impedance responsive to gap emf effective to generate a control emf representative of instantaneous gap emf, a storage capacitor supplied by the said circuit means, a high input impedance servo control system responsive to momentary emf of the said storage capacitor to control relative movement of the tool and workpiece to optimize gap width, logic circuit means responsive to gap emf and to gap discharge "on" time effective in response to gap emf below a predetermined threshold during "on" time of the pulse discharges to discharge the said storage capacitor so as to drive the servo control system to widen the gap, means effective to disable the servo control system during traversing movement of the tool, and means responsive to gap emf below a predetermined threshold to block operation of the disabling means so that control by the servo control system is reestablished".

* * * * *